United States Patent
Usui

(10) Patent No.: US 7,675,546 B2
(45) Date of Patent: Mar. 9, 2010

(54) IMAGING DEVICE HAVING FUNCTION FOR CORRECTING IMAGE SHAKE OF ACQUIRED IMAGE

(75) Inventor: Kazutoshi Usui, Kawasaki (JP)

(73) Assignee: Nikon Corporation, Tokyo (JP)

(*) Notice: Subject to any disclaimer, the term of this patent is extended or adjusted under 35 U.S.C. 154(b) by 350 days.

(21) Appl. No.: 11/660,499

(22) PCT Filed: Sep. 14, 2005

(86) PCT No.: PCT/JP2005/016921
§ 371 (c)(1),
(2), (4) Date: Feb. 20, 2007

(87) PCT Pub. No.: WO2006/030819
PCT Pub. Date: Mar. 23, 2006

(65) Prior Publication Data
US 2007/0253732 A1    Nov. 1, 2007

(30) Foreign Application Priority Data
Sep. 15, 2004    (JP) .............................. 2004-268880

(51) Int. Cl.
H04N 5/228    (2006.01)
G03B 17/00    (2006.01)

(52) U.S. Cl. ..................................... 348/208.5; 396/55

(58) Field of Classification Search ............. 348/208.5, 348/208.1, 208.2, 208.6; 396/52, 54, 55
See application file for complete search history.

(56) References Cited

U.S. PATENT DOCUMENTS

| | | | | |
|---|---|---|---|---|
| 5,282,044 A | * | 1/1994 | Misawa et al. | 348/208.5 |
| 5,365,303 A | | 11/1994 | Yamasaki et al. | |
| 5,867,213 A | * | 2/1999 | Ouchi | 348/208.5 |
| 5,982,421 A | * | 11/1999 | Inou et al. | 348/208.5 |
| 7,057,645 B1 | * | 6/2006 | Hara et al. | 348/208.6 |
| 7,123,290 B2 | * | 10/2006 | Ohishi | 348/208.4 |
| 7,176,962 B2 | * | 2/2007 | Ejima | 348/208.4 |
| 7,385,632 B2 | * | 6/2008 | Shinohara et al. | 348/208.5 |
| 2001/0022619 A1 | * | 9/2001 | Nishiwaki | 348/208 |
| 2004/0001147 A1 | * | 1/2004 | Vella et al. | 348/208.99 |
| 2005/0231603 A1 | * | 10/2005 | Poon | 348/208.99 |
| 2006/0110147 A1 | * | 5/2006 | Tomita et al. | 396/55 |

FOREIGN PATENT DOCUMENTS

| | | |
|---|---|---|
| JP | S 62-127976 | 6/1987 |
| JP | A 05-323444 | 12/1993 |
| JP | 09261526 A * | 10/1997 |
| JP | A 2000-224470 | 8/2000 |
| JP | A 2002-107787 | 4/2002 |
| JP | A 2005-204185 | 7/2005 |

* cited by examiner

Primary Examiner—John M Villecco
(74) Attorney, Agent, or Firm—Oliff & Berridge, PLC

(57) ABSTRACT

An imaging device photoelectrically converts a subject image to generate image data. The imaging device has a function of selectively performing two types of image vibration correction processings on this image data. The imaging device makes a selection/switching between the image vibration correction processings in accordance with a determination of an exposure period required to shoot the image data.

18 Claims, 5 Drawing Sheets

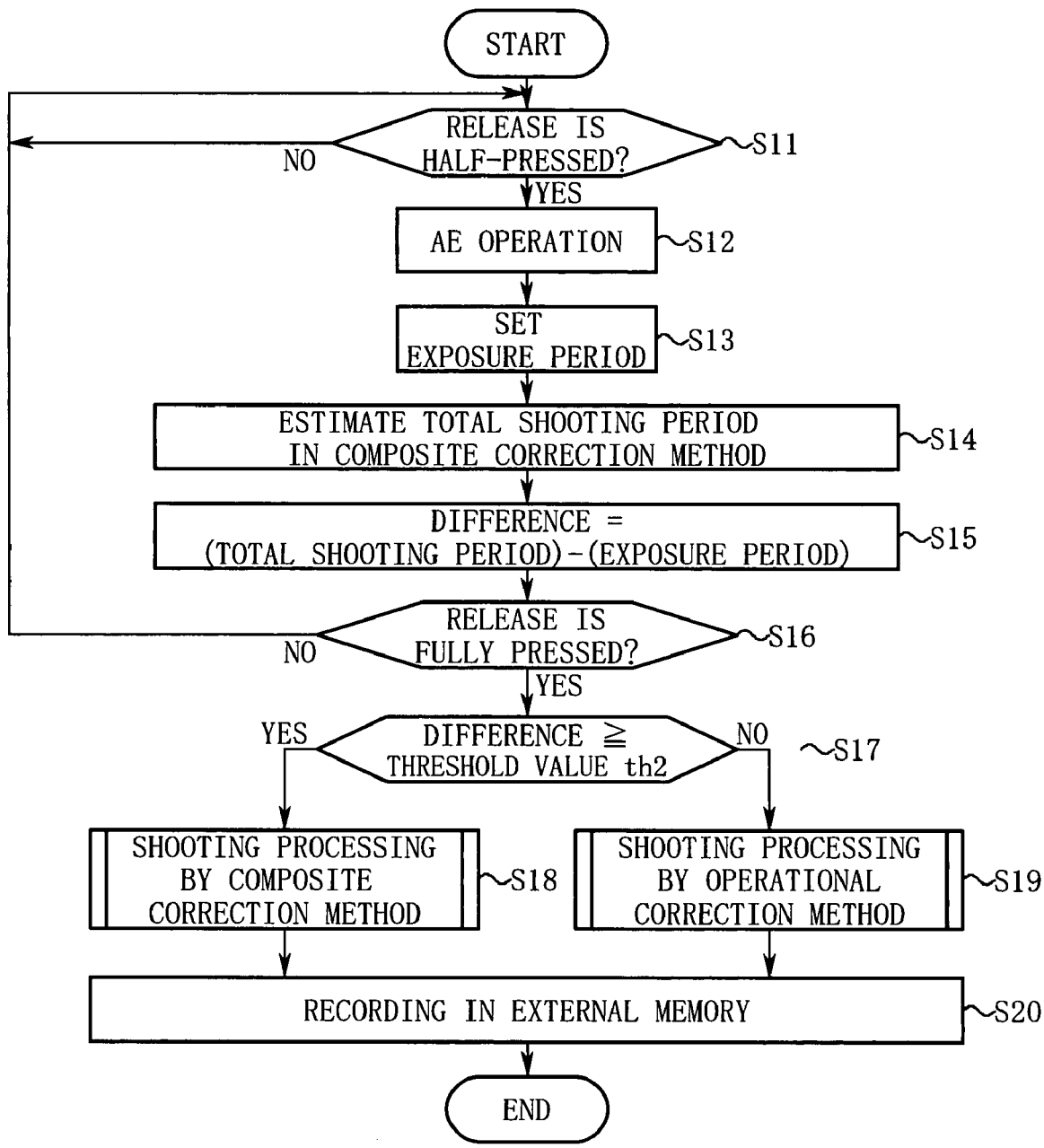

IMAGING DEVICE HAVING FUNCTION FOR CORRECTING IMAGE SHAKE OF ACQUIRED IMAGE

This application is a U.S. National Stage application claiming the benefit of prior filed International Application Number PCT/JP2005/016921, filed Sep. 14, 2005, in which the International Application claims a priority date of Sep. 15, 2004 based on prior filed Japanese Application Number 2004-268880, the entire contents of which are incorporated herein by reference.

TECHNICAL FIELD

The present invention relates to an imaging device with a function of correcting an image vibration of an image shot.

BACKGROUND ART

A technique of correcting an image vibration by image processing after shooting has been heretofore known.

For example, in Patent Documents 1 and 2, an inverse filter is derived from a point spread function obtained from a locus of an image vibration. By applying this inverse filter to an image shot, the image vibration of the image shot is corrected (hereinafter, this vibration correction method is referred to as an "operational correction method").

Moreover, for example, in Patent Document 3, by performing plural times of division exposures and registering and composing obtained plural images, an image vibration of an image shot is corrected (hereinafter, this vibration correction method is referred to as a "composite correction method").

Patent Document 1: Japanese Unexamined Patent Application Publication No. Sho 62-127976 (Claims and so on)
Patent Document 2: Japanese Unexamined Patent Application Publication No. Hei 5-323444 (Claim 1 and so on)
Patent Document 3: Japanese Unexamined Patent Application Publication No. 2002-107787 (Claim 1 and so on)

DISCLOSURE OF THE INVENTION

Problems to be Solved by the Invention

Meanwhile, the present inventor thinks that by switching between the above "operational correction method" and "composite correction method" in accordance with a suitable condition, drawbacks of both the methods can be compensated for while advantages of both the methods are brought out.

Hence, an object of the present invention is to provide an imaging device which selects from plural types of image vibration corrections and performs the selected one.

Further, another object of the present invention is to provide an imaging device which appropriately switches the "operational correction method" and the "composite correction method"

Means for Solving the Problems

<1> An imaging device of the present invention has an imaging section, a first image vibration correcting section, a second image vibration correcting section, and a selection control section.

The imaging section photoelectrically converts a subject image to generate image data.

The first image vibration correcting section performs an image vibration correction on the image data.

The second image vibration correcting section performs an image vibration correction different from a first image vibration correction on the image data.

The selection control section selects whether the first image vibration correcting section is used or the second image vibration correcting section is used for the image vibration correction of the image data based on an exposure period required for the photoelectric conversion of the image data.

<2> More preferably, the first image vibration correcting section applies an inverse filter of a point spread function indicating an image vibration during the exposure period to the image data to correct the image vibration. On the other hand, the second image vibration correcting section corrects the image vibration of the image data by allowing the imaging section to perform imaging operations of plural times obtained by dividing the exposure period and registering and composing obtained plural frames of divided image data.

<3> Still more preferably, it further has a vibration detecting section detecting a vibration which causes the image vibration, and the first image vibration correcting section corrects the image vibration of the image data using the inverse filter of the point spread function according to the vibration detected by the vibration detecting section.

<4> Further more preferably, the vibration detecting section includes an angular speed sensor.

<5> Yet more preferably, the second image vibration correcting section registers and composes the plural frames of the divided image data by pattern matching using a block matching method.

<6> Even still more preferably, the selection control section determines the exposure period by a threshold value according to a transfer period required to read an image of the imaging section and a division exposure count by the second image vibration correcting section and makes the selection between the first image vibration correcting section and the second image vibration correcting section according to a result of the determination.

<7> Even yet more preferably, the selection control section determines the exposure period by a threshold value according to a transfer period required to read an image of the imaging section and a focal length when the image data is shot and makes the selection between the first image vibration correcting section and the second image vibration correcting section according to a result of the determination.

<8> A control method of an imaging device of the present invention is a method of making the same selection and performance of an image vibration correction as in the above <1>.

<9> More preferably, in the above control method, the same options for image vibration correction processing as in the above <2> are provided.

<10> A program of the present invention is a program to cause a computer to execute the control method according to the above <8>.

<11> A recording medium of the present invention is a machine-readable recording medium on which a program to cause a computer to execute the control method according to the above <8> is recorded.

<12> Another imaging device of the present invention has an imaging section, an operational correction section, a composite correction section, an exposure period determining section, and a selection control section.

This imaging section photoelectrically converts a subject image over a preset exposure period to generate image data.

The operational correction section applies an inverse filter of a point spread function indicating an image vibration during the exposure period to the image data to correct the image vibration.

The composite correction section corrects the image vibration of the image data by allowing the imaging section to perform imaging operations of plural times obtained by dividing the exposure period and registering and composing obtained plural frames of divided image data.

The exposure period determining section determines the exposure period by a predetermined threshold value.

The selection control section performs the image vibration correction by the operational correction section if the exposure period is less than the threshold value and performs the image vibration correction by the composite correction section if the exposure period is equal to or more than the threshold value.

<13> More preferably, the exposure period determining section determines the threshold value based on a multiplication result obtained by multiplying "a transfer period required to read an image of the imaging section" by "a division exposure count of the composite correction section" to make the above determination of the exposure period.

<14> Another imaging device of the present invention has an imaging section, an operational correction section, a composite correction section, an exposure period determining section, and a selection control section.

The imaging section photoelectrically converts a subject image over a preset exposure period to generate image data.

The operational correction section applies an inverse filter of a point spread function indicating an image vibration during the exposure period to the image data to correct the image vibration.

The composite correction section corrects the image vibration of the image data by allowing the imaging section to perform imaging operations of plural times obtained by dividing the exposure period and registering and composing obtained plural frames of divided image data.

The exposure period determining section makes a threshold determination as to whether or not a difference between a total shooting period required for the plural times of division exposures by the composite correction section and the exposure period is large.

The selection control section performs the vibration correction by the operational correction section if it is determined by the exposure period determining section that the difference is large and performs the vibration correction by the composite correction section if it is determined that the difference is small.

Effect of the Invention

An imaging device of the present invention selects image vibration correction processing according to an exposure period of image data. Accordingly, it becomes possible to perform the image vibration correction processing capable of producing a more suitable effect according to an image vibration which changes depending on the exposure period.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 5 is a diagram describing the operation of a second embodiment.

BEST MODE FOR CARRYING OUT THE INVENTION

First Embodiment

Description of Configuration of First Embodiment

Figure 1:
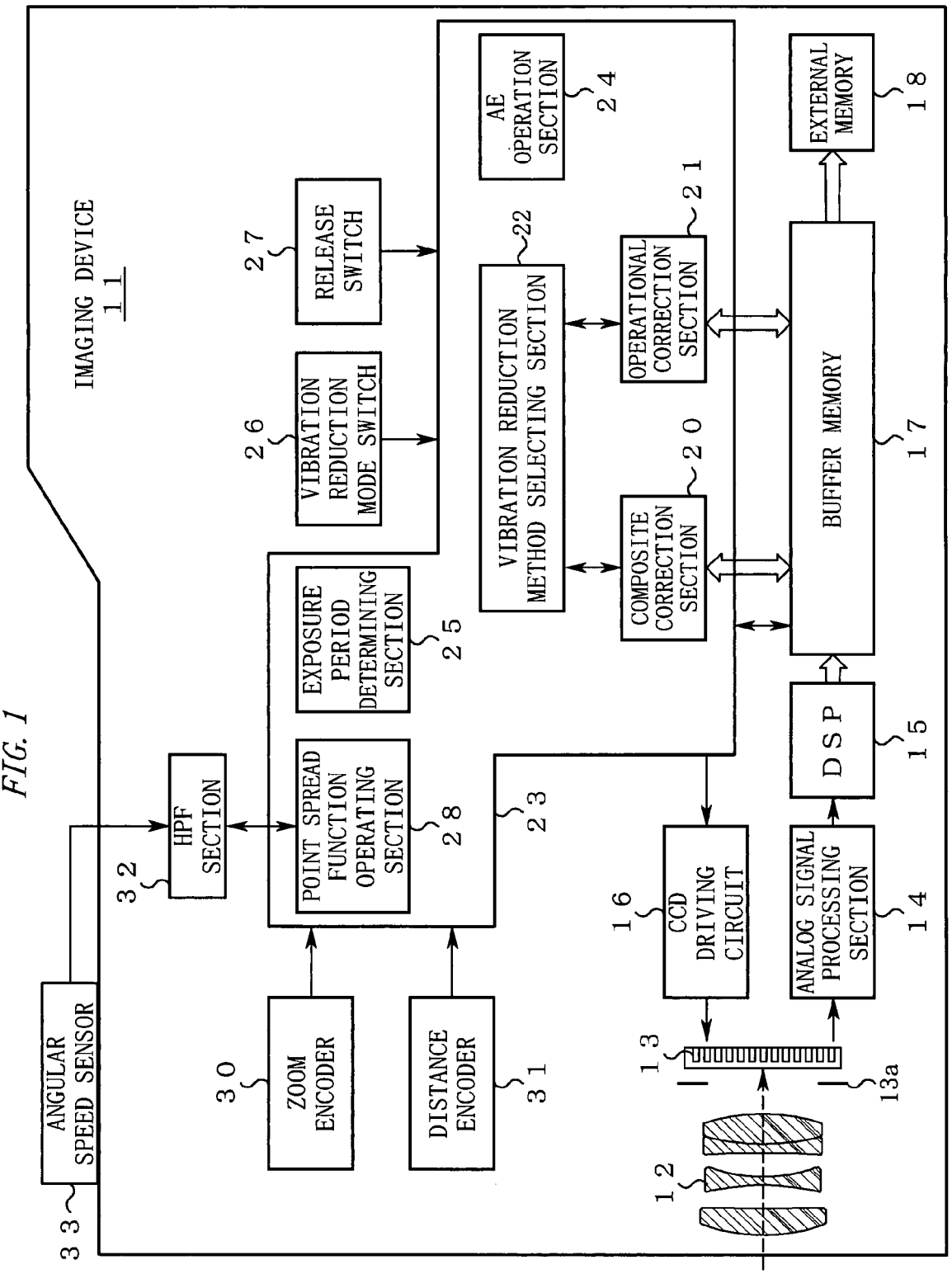
FIG. 1 is a diagram showing the configuration of an imaging device 11 in a first embodiment.

FIG. 1 is a diagram showing the configuration of an imaging device 11 in the first embodiment.

In FIG. 1, a shooting lens 12 is attached to the imaging device 11. In an image space of this shooting lens 12, a shutter 13a and an imaging area of an imaging sensor 13 are placed. This imaging sensor 13 outputs image data in accordance with a drive pulse of a CCD driving circuit 16. This image data is stored in a buffer memory 17 after being processed via an analog signal processing section 14 and a DSP (digital signal processing section) 15.

To perform two types of vibration corrections on the image data in the buffer memory 17, a composite correction section 20 and an operational correction section 21 are provided. These two types of correction sections 20 and 21 are switched-controlled by a vibration reduction method selecting section 22. These components 20 to 22 are realized by functions of a CPU 23.

In addition, functions of an AE operation section 24, an exposure period determining section 25, a point spread function operating section 28, and so on are also realized by the CPU 23. An angular speed sensor 33 is connected to the point spread function operating section 28 via an HPF section 32.

Further, a vibration reduction mode switch 26, a release switch 27, a zoom encoder 30, a distance encoder 31, and so on are connected to the CPU 23.

Description of Operation of First Embodiment

Figure 2:
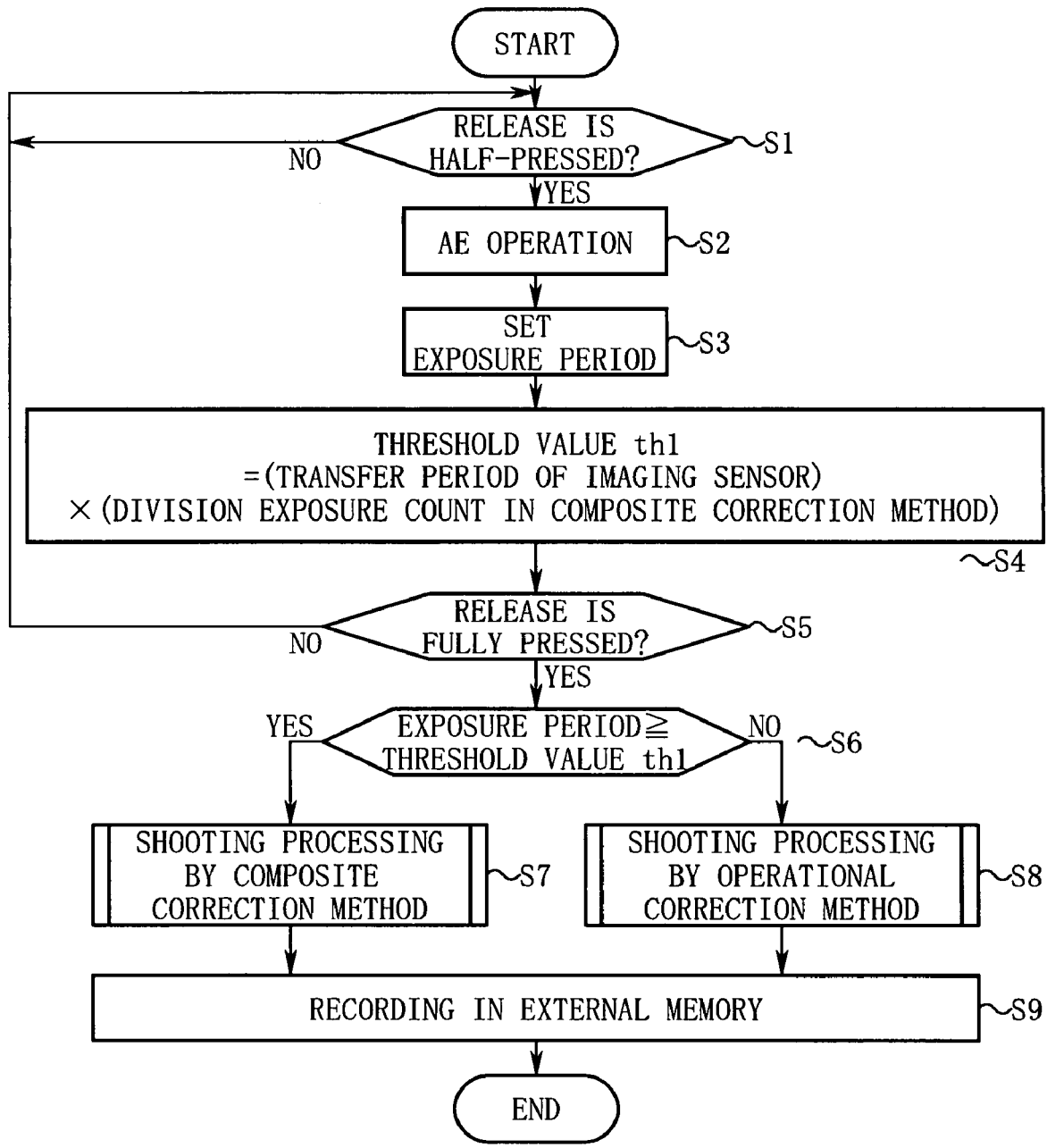
FIG. 2 is a diagram describing the operation of the first embodiment.

FIG. 2 is a diagram describing the operation of the first embodiment.

The operation will be described along step numbers shown in FIG. 2.

Step S1: When a main power supply of the imaging device 11 is turned on, the CPU 23 performs the sequence of initialization. After completion of this initialization, the CPU 23 enters a state of waiting for a half-press manipulation of the release switch 27.

When a user half-presses the release switch 27 in this state, the CPU 23 shifts the operation to step S2.

Step S2: The CPU 23 drives the imaging sensor 13 via the CCD driving circuit 16 to fetch image data for control. The AE operation section 24 derives a subject brightness from this image data for control.

Step S3: In a program exposure mode and an aperture priority exposure mode, the exposure period determining section 25 determines an exposure period to obtain a correct exposure based on the subject brightness derived from the image data for control. Incidentally, in a manual exposure mode and a shutter priority mode, the exposure period determining section 25 determines the exposure period based on user setting or the like.

Step S4: The vibration reduction method selecting section 22 determines a division exposure count and a division exposure period from the exposure period, assuming that a composite correction method is selected.

Usually it is said that in a 135 (35 mm imaging area size) format camera, a photograph in which vibration is less visible can be taken by setting to a shutter speed of "1/(focal length)" second or less. Hence, the vibration reduction method selecting section 22 converts a focal length of the shooting lens 12 on which information is acquired from the zoom encoder 30 into a focal length equivalent to an angle of view of the 135 format. The vibration reduction method selecting section 22 determines a combination of the division exposure count and the division exposure period so that the division exposure period obtained by dividing the exposure period falls within safe vibration limits equal to or less than "1/(converted focal length)" second.

Next, the vibration reduction method selecting section 22 calculates a threshold value th1 based on a result of multiplication of the determined division exposure count and a transfer period of the imaging sensor 13. For example, if the division exposure count is four and the transfer period is 200 msec, the threshold value th1 becomes 0.8 sec. Alternatively, the threshold value th1 may be (0.8×k) sec or (0.8+k) sec. It is desirable to set the value k in this case by image quality evaluation and simulation so that the threshold value th1 becomes a boundary between propriety and impropriety of the composite correction method/operational correction method.

Step S5: Here, the CPU 23 determines whether the release switch 27 is fully pressed or not.

If a full-press manipulation is not detected, the CPU 23 returns the operation to step S1.

On the other hand, if the full-press manipulation is detected, the CPU 23 shifts the operation to step S6.

Step S6: The CPU 23 makes a threshold determination of the exposure period set in step S3 by the threshold value th1.

If the exposure period is equal to or more than the threshold value th1, the CPU 23 selects the composite correction method as a vibration reduction method and shifts the operation to step S7.

On the other hand, if the exposure period is less than the threshold value th1, the CPU 23 selects the operational correction method as the vibration reduction method and shifts the operation to step S8.

Step 7: Here, shooting processing by the composite correction method is performed in the following steps A1 to A4.

(A1) The composite correction section 20 opens the shutter 13a and starts exposure (charge storage) of the imaging sensor 13. The imaging sensor 13 stores signal charges until the division exposure period passes from the start of this exposure.

(A2) When the division exposure period passes, the composite correction section 20 closes the shutter 13a and reads image data from the imaging sensor 13 via the CCD driving circuit 16. Incidentally, during the transfer period of this image data, the composite correction section 20 opens the shutter 13a and starts the next division exposure in parallel with a transfer operation. Note that if no spare time is inserted since plural division exposure periods continue, opening/closing operation of the shutter 13a may be omitted.

(A3) The above operation in (A2) is repeated the same number of times as the division exposure count to obtain plural frames of divided image data.

(A4) The composite correction section 20 obtains image data on which the vibration correction is already performed by composing the plural frames of divided image data after registering them by pattern matching. Publicly known block matching method, sequential similarity detection algorithm, and so on are usable for this pattern matching.

Incidentally, the divided image data may be registered based on a vibration locus obtained from a result of detection by the angular speed sensor 33.

After such shooting processing by the composite correction method is completed, the CPU shifts the operation to step S9.

Step S8: Here, shooting processing by the operational correction method is performed in the following steps B1 to B5.

(B1) The operational correction section 21 opens the shutter 13a and starts exposure (charge storage) of the imaging sensor 13. The imaging sensor 13 stores signal charges until the exposure period passes from the start of this exposure.

(B2) When the exposure period passes, the operational correction section 21 closes the shutter 13a and reads image data from the imaging sensor 13 via the CCD driving circuit 16.

(B3) The point spread function operating section 28 samples angular speed data of the angular speed sensor 33 via the HPF section 32 in parallel to the exposure period. The point spread function operating section 28 obtains a vibration angle $\theta(t)$ at a time t during the exposure period by subjecting an HPF output of this angular speed data to time integration.

(B4) The point spread function operating section 28 calculates a shooting magnification $\beta$ based on the focal length information obtained from the zoom encoder 30 and subject distance information R obtained from the distance encoder 31. The point spread function operating section 28 finds a vibration X(t) on an image plane by substituting these information into the following equation.

$$X(t)=\beta \cdot R \cdot \theta(t) \quad (1)$$

By converting this vibration X(t) on the image plane into an exposure amount per pixel of a point image, a point spread function p(x, y) at pixel coordinates (x, y) is obtained.

Using this point spread function p(x, y), the relation between an original image o(x, y) and a vibrated image z(x, y) can be expressed by the following convolution integral operator *.

$$z(x, y)=o(x, y)*p(x, y) \quad (2)$$

If the above equation is converted into a special frequency (u, v) domain by frequency conversion, the following equation is obtained.

$$Z(u, v)=O(u, v) \cdot P(u, v) \quad (3)$$

Note that Z(u, v), O(u, v), and P(u, v) in the above equation are spectrums obtained by frequency-converting z(x, y), o(x, y), and p(x, y), respectively. Incidentally, P(u, v) obtained by frequency-converting the point spread function p(x, y) is particularly called a spatial frequency transfer function.

By transforming this equation (3), the spectrum O(u, v) of the original image becomes as follows.

$$O(u, v)=Z(u, v)/P(u, v) \quad (4)$$

Namely, if an inverse filter 1/P(u, v) in the equation (4) can be determined, the spectrum of the original image O can be restored.

Meanwhile, a spatial frequency domain (u0, v0) where P(u0, v0)=0 exists, the following equation is obtained.

$$O(u0, v0)=Z(u0, v0)/P(u0, v0)=0/0=\text{indeterminate} \quad (5)$$

This means that a missing spectrum which has not be transferred by P(u, v) cannot be restored, and the frequency domain (u0, v0) of a missing component cannot be determined since the inverse filter 1/P becomes infinite.

Hence, the point spread function operating section 28 approximates the inverse filter 1/P in the equation (4) by a Wiener filter limited by a predetermined upper limit c and uses it as the inverse filter.

$$\text{Wiener filter: } P(u, v)/[|P(u, v)|^2 + 1/c] \tag{6}$$

(B5) The point spread function operating section 28 finds the spectrum of the original image by making the obtained inverse filter (Wiener filter) act on the spectrum Z(u, v) of the vibrated image. By inversely frequency-converting the spectrum of the original image, approximate restoration (vibration correction by an operation) of the original image is performed.

Incidentally, it is also possible that by inversely frequency-converting the inverse filter (Wiener filter), a waveform correcting function for correcting a vibrated waveform of the point spread function p(x, y) is found, and that the original image is approximately restored by calculating a convolution integral between this waveform correcting function and the vibrated image z(x, y).

After such shooting processing by the operational correction method is completed, the CPU 23 shifts the operation to step S9.

Step S9: The imaging device 11 stores image data on which the vibration correction is completed in step S7 or step S8 in an external memory 18.

Effect and so on of First Embodiment

In the first embodiment, if the exposure period (division exposure period×division transfer count) becomes equal to or more than the threshold value th1 (=transfer period×division transfer count), the composite correction method is selected and performed.

Figure 3:
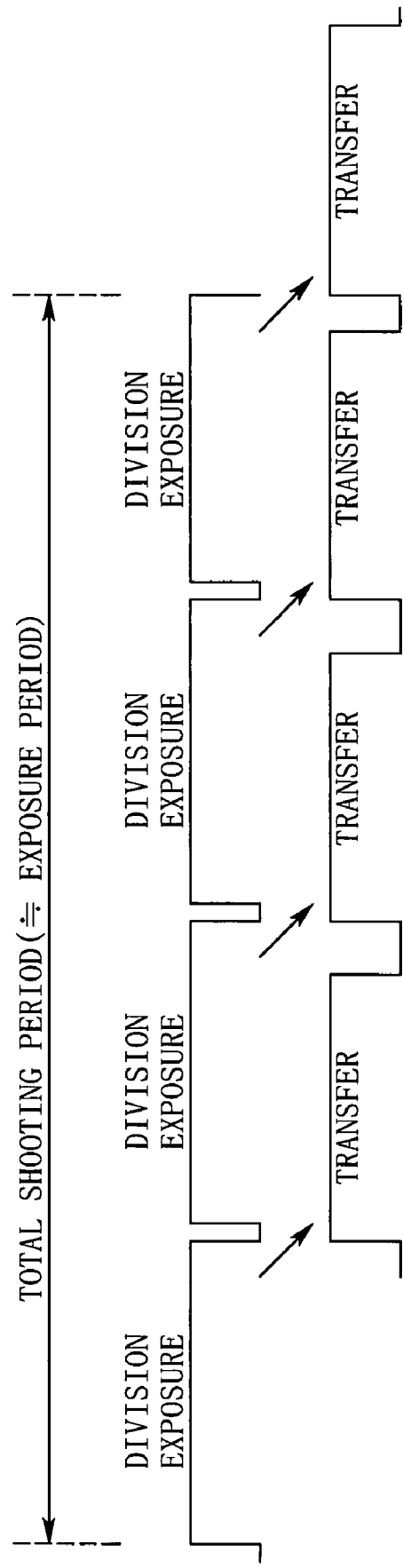
FIG. 3 is a timing chart of a composite correction method.

In this case, as shown in FIG. 3, the division exposure period is longer than the transfer period, and thereby plural times of division exposures virtually continue. Therefore, in the image data after composition, separation of a moving subject is inconspicuous, so that good composite image data can be obtained.

Also as shown in FIG. 3, the total shooting period during which the user maintains a shooting posture and the exposure period substantially match. Therefore, an uncomfortable feeling arising from a mismatch between the periods is not given to the user. Further, a problem of forcing the user to extend the shooting posture does not arise.

On the other hand, if the exposure period (division exposure period×division transfer count) becomes less than the threshold value th1 (=transfer period×division transfer count), the operational correction method is selected and performed.

In this case, the exposure period is relatively short, and there are only a few missing spatial frequency components due to vibration. In this sate, there are very few frequency domains where the spatial frequency transfer function becomes zero, which makes it possible to determine the inverse filter close to ideal. As a result, a good vibration correcting effect by the operational correction method can be obtained.

Figure 4:
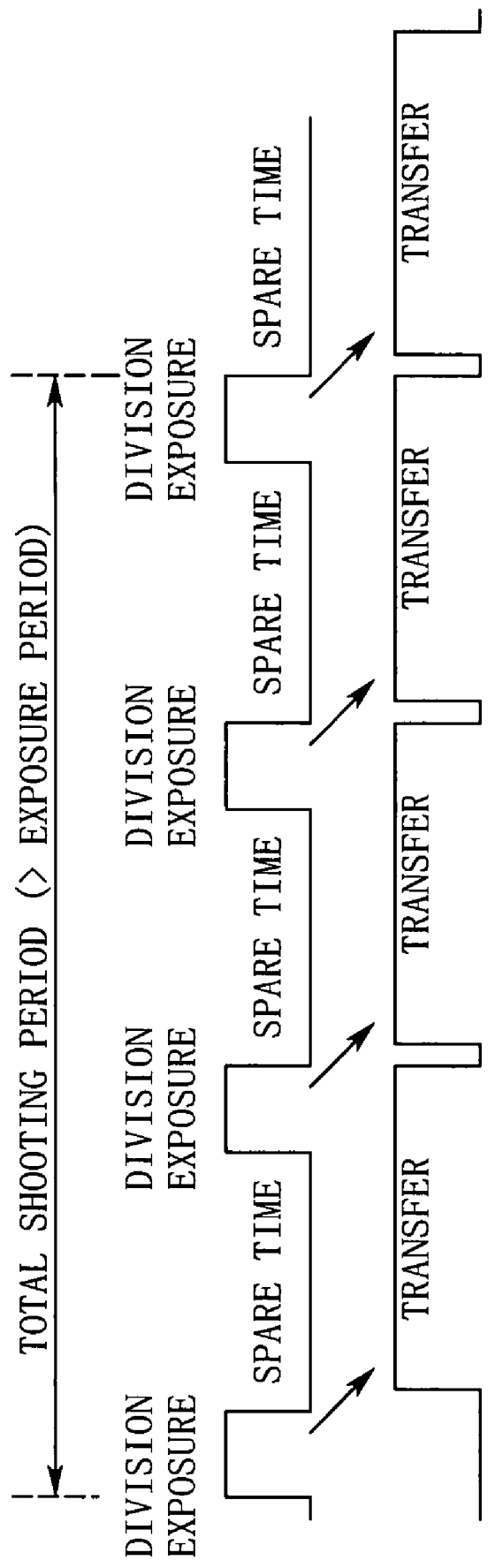
FIG. 4 is a timing chart when the composite correction method is selected and performed in a state where an exposure period is less than a threshold value th1.

Incidentally, FIG. 4 is a diagram showing a case where the composite correction method is tentatively performed when the exposure period becomes less than the threshold value th1. In FIG. 4, since the division exposure period is shorter than the transfer period, the need for inserting a spare time between the division exposures. Hence, the division exposures are intermittently performed, and consequently in the image data after composition, the moving subject becomes separated. Moreover, as shown in FIG. 4, a problem of forcing the user to maintain the shooting posture longer by "spare time×(division transfer count−1)" arises.

In the first embodiment, in the case shown in FIG. 4, the operational correction method is performed in place of the composite correction method, so that these problems can be avoided.

Next, another embodiment will be described.

Second Embodiment

An imaging device of the second embodiment has the same configuration as the imaging device 11 (FIG. 1) of the first embodiment, and a repeated description is omitted.

FIG. 5 is a diagram describing the operation of the second embodiment.

The operation will be described along step numbers shown in FIG. 5.

Steps S11 to S13: The same operation as in steps S1 to S3 in the first embodiment.

Step S14: The vibration reduction method selecting section 22 determines the division exposure count and the division exposure period used in the composite correction method from the set value of the exposure period.

Then, based on the determined division exposure count and division exposure period, the vibration reduction method selecting section 22 estimates the total shooting period required for division exposures corresponding to the division exposure count (namely, the period during which the user maintains the shooting posture).

For example, if the determined division exposure period is longer than the transfer period of the imaging sensor 13 as shown in FIG. 3, the total shooting period becomes almost equal to the exposure period.

On the other hand, if the division exposure period is shorter than the transfer period as shown in FIG. 4, the total shooting period becomes almost equal to "division exposure period+transfer period*(division exposure count−1)".

Step S15: Subsequently, the vibration reduction method selecting section 22 calculates a difference between the total shooting period and the exposure period.

Step S16: Here, the CPU 23 determines whether the release switch 27 is fully pressed or not.

If a full-press manipulation is not detected, the CPU 23 returns the operation to step S11.

On the other hand, if the full-press manipulation is detected, the CPU 23 shifts the operation to step S17.

Step S17: The CPU 23 makes a threshold determination of the difference acquired in step S15 by a threshold value th2. A value acquired as a limit value at which the difference between the total shooting period and the exposure period does not give an uncomfortable feeling to the user from subjective tests and so on is previously set as this threshold value th2.

If the difference between the total shooting period and the exposure period is less than the threshold value th2, the CPU 23 selects the composite correction method as the vibration reduction method and shifts the operation to step S18.

On the other hand, if the difference between the total shooting period and the exposure period is equal to or more than the threshold value th2, the CPU 23 selects the operational correction method as the vibration reduction method and shifts the operation to step S19.

Step S18: The shooting processing by the composite correction method is performed. Since the details are the same as in step S7 in the first embodiment, a repeated description is omitted here. After this operation, the operation is shifted to step S20.

Step S19: The shooting processing by the operational correction method is performed. Since the details are the same as in step S8 in the first embodiment, a repeated description is omitted here.

Step S20: The imaging device 11 stores image data on which the vibration correction is completed in step S18 or step S19 in the external memory 18.

Effect and so on of Second Embodiment

In the second embodiment, if the threshold determination of the difference between the total shooting period and the exposure period expected in the composite correction method is made and the difference is equal to or more than the threshold value, the operational correction method is selected. As a result, switching to the operational correction method in anticipation of a situation in which the total shooting period in the composite correction method is very different from the exposure period and this gives an uncomfortable feeling to the user becomes possible.

Further, by selecting the operational correction method if the difference is equal to or more than the threshold value, the problem that the division exposures in the composite correction method become intermittent and consequently in the image data after composition, the moving subject becomes separated can be certainly avoided.

Description of Principles of Embodiments

To facilitate application to another embodiment, the principles of the above embodiments will be described.

First, the relation between the "exposure period" and the "propriety/impropriety of vibration correction" is considered.

(Case where the exposure period is obviously short)

Generally, the shorter the exposure period, the smaller the image vibration becomes, and the disappearance of small image information (high frequency components of the spatial frequency) decreases. If the operational correction method is selected in this case, by allowing the inverse filter to act on the remaining high-frequency components, the signal level and the spatial phase of the image information attenuated by the vibration can be properly restored. Accordingly, the shorter the exposure period, the higher the success rate of the vibration correction by the operational correction method becomes.

On the other hand, in the composite correction method, the transfer and reading of the divided image data needs to be completed between the division exposure periods. Therefore, if the exposure period becomes shorter, there is not enough time to complete the reading of the divided image data, which causes the need for inserting the spare time between the division exposure and the division exposure. This insertion of the spare time causes intermittent division exposures, so that, for the subject with a movement, the movement is shot at intervals. If the divided image data are composed in this state, the movement is separated at intervals and the resulting movements overlap, leading to an unnatural image. Accordingly, the shorter the exposure period, the lower the success rate of the vibration correction by the composite correction method becomes.

Further, in the composite correction method, even if the exposure period becomes extremely short, plural times of transfer periods are still required, so that the total shooting period during which the imaging device is held toward the subject is not so much shortened.

For example, if an exposure period of 1/50 sec is divided into plural times, and between exposures, a transfer period of 400 msec is performed three times, the total shooting period takes about 1.2 sec. In this case, a marked difference occurs between the exposure period and the total shooting period, for example, the total shooting period takes about 1.2 sec with respect to the setting of the exposure period of 1/50 sec, which gives an uncomfortable feeling to the user. For such a reason, when the exposure period is short, the vibration correction by the composite correction method is not suitable.

(Case where the exposure period is obviously long)

By contrast, the longer the exposure period, the larger the image vibration by the operational correction method becomes, and a large amount of small image information (such as high frequency components) disappears. Hence, in the operational correction method, it becomes difficult to create the inverse filter of the point spread function. Further, even if the forcedly created inverse filter is used, only up to middle frequency components at most can be restored, which causes a possibility of amplifying noise of high frequency components, instead. Therefore, the longer the exposure period, the lower the success rate of the vibration correction by the operational correction method becomes.

On the other hand, in the composite correction method, even if the exposure period is lengthened, each division exposure period can be kept short by increasing the division exposure count. Accordingly, it is relatively easy to keep the image vibration of each divided image data from exceeding an allowable range, and the image vibration after composition can be kept small. Hence, when the exposure period is long, the success rate of the vibration correction by the composite correction method increases.

(About switching between the image vibration corrections according to the exposure period)

Based on the above consideration, in the imaging devices of the present embodiments, it is desirable to select the vibration correction method based on a comparison result between the exposure period and the threshold value in the following manner.

First, if the exposure period is shorter than the threshold value, the vibration correction by the operational correction method is selected. In this case, since the exposure period is short, the disappearance of the image information and loss of waveforms are small, whereby the probability that the image data can be properly restored by the operational correction method increases.

On the other hand, if the exposure period is equal to or longer than the threshold value, the vibration correction by the composite correction section is performed. In this case, even if the exposure period is long, each division exposure period is short, so that the image vibration after composition is small. As a result, when the exposure period is long, the success rate of the vibration correction markedly increases.

As just described, switching between both the methods based on the determination of the length of the exposure period makes it possible to increase the success rate of the vibration correction comprehensively.

(About a change of the threshold value of the exposure period)

Moreover, in the imaging devices of the present embodiments, it is desirable to determine the threshold value according to a multiplication result obtained by multiplying "a transfer period required to read an image of the imaging section" by "a division exposure count of the composite correction section".

When the composite correction method is performed, image reading needs to be performed the same number of times as the division exposure count. The above multiplication result corresponds to the total time of these read operations. In the composite correction method, no matter how short the exposure period becomes, the total time of these read operations cannot be shortened.

If the exposure period is shorter than the multiplication result, in the composite correction method, the spare time needs to be inserted between, the division exposure and the division exposure to fill a time difference between the multiplication result and the exposure time. In this case, for the subject with a movement, the movement of the subject is shot at intervals since the division exposures are intermittently separated by the spare times. If the divided image data are composed in this state, moving subjects overlap at discrete positions, resulting in an unnatural image.

Hence, the length of the exposure time is determined by the threshold value based on the multiplication result. Here, if the exposure period is shorter than the threshold value, the operational correction method is selected. This selection operation enables appropriate switching to the operational correction method in anticipation of a situation in which the movement of the subject discretely vibrates.

(About a comparison between the exposure period and the total shooting period in the composite correction method)

In the present embodiments, a threshold determination as to whether the difference between the total shooting period predicted in the composite correction method and the exposure period is large is also possible.

The larger this difference, the longer the spare time between the division exposures becomes in the composite correction method. Therefore, for the subject with a movement, continuity of the movement of the subject is lost since the exposure is cut by long spare times. If the divided image data are composed in this state, moving subjects overlap at discrete positions, resulting in an unnatural image.

Hence, when it is determined by the threshold determination that the above difference is large, switching to the operational correction method is performed. This switching operation can certainly avoid a problem that the movement of the subject discretely vibrates.

Further, this switching operation to the operational correction method makes appropriate switching to the operational correction method in anticipation of a situation in which in the composite correction method, the total shooting period and the exposure period are very different and this gives an uncomfortable feeling to the user becomes possible.

Supplementary Matters of the Embodiments

Incidentally, in the first embodiment, the vibration correction method is selected based on the comparison result between the exposure period and (the transfer period*the division exposure count). However, the present invention is not limited to this. Generally, it is possible to select the vibration correction method based on the threshold determination of the exposure period.

For example, the vibration correction method may be selected based on a comparison result (difference or ratio) between the division exposure period and the transfer period.

Moreover, for example, when the division exposure period is set to about "1/(135 format equivalent focal length)" second, the vibration correction method may be selected based on a comparison result between "1/(135 format equivalent focal length)" second and the transfer period.

Further, it is also possible to determine a threshold value indicating a boundary between propriety and impropriety of the vibration correction method based on the transfer period and the focal length and select the vibration correction method based on the threshold determination of the exposure period.

On the other hand, in the second embodiment, the vibration correction method is selected based on the difference between the total shooting period (period until all the division exposures are completed) predicted in the composite correction method and the exposure period. However, the present invention is not limited to this. Generally, it is possible to select the vibration correction method using a value indicating a tendency equivalent to this difference.

For example, the vibration correction method may be selected based on a value of "(a difference between the transfer period and the division exposure period)×the division exposure count".

Incidentally, in the present embodiments, an amplification-type imaging sensor such as a CMOS sensor can be used as the imaging sensor. Further, an angular speed sensor or an acceleration sensor can be used for vibration detection. Incidentally, if an AD method (Ayers-Dainty Algorithm) is used, image vibration correction can be performed without using a physical sensor. Furthermore, as vibration correction processing of a pseudo image, edge enhancement processing may be used as an option therefor.

Moreover, when the exposure time is sufficiently short, it may be judged that neither the composite correction nor the operational correction needs to be performed. In this case, the "composite correction", the "operational correction", "neither of the vibration corrections is performed", and so on can be used as options.

Incidentally, a control method of the above imaging device may be programmed and executed by a computer. Further, this program may be recorded on a machine-readable recording medium.

The invention is not limited to the above embodiments and various modifications may be made without departing from the spirit and scope of the invention. Any improvement may be made in part or all of the components.

What is claimed is:

1. An imaging device, comprising:
    an imaging section photoelectrically converting a subject image over a preset exposure period to generate image data;
    a first image vibration correcting section obtaining an image vibration of said image data during said exposure period and performing an image vibration correction on said image data;
    a second image vibration correcting section performing an image vibration correction on said image data by allowing said imaging section to perform imaging operations plural times during said exposure period and by registering and composing obtained plural image data; and
    a selection control section determining said exposure period based on a threshold value according to a transfer period required to read an image of said imaging section and a count of said imaging operations by said second image vibration correcting section to select one of said first image vibration correcting section and said second image vibration correcting section for the image vibration correction of said image data.

2. The imaging device according to claim 1, wherein:
said first image vibration correcting section applies an inverse filter of a point spread function indicating an image vibration during said exposure period to said image data to correct said image vibration.

3. The imaging device according to claim 2, further comprising:
a vibration detecting section detecting a vibration which causes said image vibration, wherein
said first image vibration correcting section corrects said image vibration of said image data using the inverse filter of the point spread function according to the vibration detected by said vibration detecting section.

4. The imaging device according to claim 3, wherein
said vibration detecting section includes an angular speed sensor.

5. The imaging device according to claim 2, wherein
said second image vibration correcting section registers and composes the plural frames of said divided image data by pattern matching using a block matching method.

6. The imaging device according to claim 1, wherein:
the selecting control section selects said first image vibration correcting section when said exposure period is less than said threshold value and selects said second image vibration correcting section when said exposure period is equal to or more than said threshold value.

7. An imaging device, comprising:
an imaging section photoelectrically converting a subject image to generate image data;
a first image vibration correcting section performing an image vibration correction on said image data;
a second image vibration correcting section performing an image vibration correction different from a first image vibration correction on said image data; and
a selection control section selecting whether said first image vibration correcting section is used or said second image vibration correcting section is used for the image vibration correction of said image data based on an exposure period required for the photoelectric conversion of said image data,
wherein said first image vibration correcting section applies an inverse filter of a point spread function indicating an image vibration during said exposure period to said image data to correct said image vibration;
said second image vibration correcting section corrects the image vibration of said image data by allowing said imaging section to perform imaging operations of plural times obtained by dividing said exposure period and registering and composing obtained plural frames of divided image data; and
said selection control section determines said exposure period by a threshold value according to a transfer period required to read an image of said imaging section and a division exposure count by said second image vibration correcting section and makes the selection between said first image vibration correcting section and said second image vibration correcting section according to a result of the determination.

8. An imaging device, comprising:
an imaging section photoelectrically converting a subject image to generate image data;
a first image vibration correcting section performing an image vibration correction on said image data;
a second image vibration correcting section performing an image vibration correction different from a first image vibration correction on said image data; and
a selection control section selecting whether said first image vibration correcting section is used or said second image vibration correcting section is used for the image vibration correction of said image data based on an exposure period required for the photoelectric conversion of said image data,
wherein said first image vibration correcting section applies an inverse filter of a point spread function indicating an image vibration during said exposure period to said image data to correct said image vibration;
said second image vibration correcting section corrects the image vibration of said image data by allowing said imaging section to perform imaging operations of plural times obtained by dividing said exposure period and registering and composing obtained plural frames of divided image data; and
said selection control section determines said exposure period by a threshold value according to a transfer period required to read an image of said imaging section and a focal length when said image data is shot and makes the selection between said first image vibration correcting section and said second image vibration correcting section according to a result of the determination.

9. An imaging device, comprising:
an imaging section photoelectrically converting a subject image over a preset exposure period to generate image data;
an operational correction section applying an inverse filter of a point spread function indicating an image vibration during said exposure period to said image data to correct said image vibration;
a composite correction section correcting the image vibration of said image data by allowing said imaging section to perform imaging operations of plural times obtained by dividing said exposure period and registering and composing obtained plural frames of divided image data;
an exposure period determining section determining said exposure period by a predetermined threshold value; and
a selection control section performing the image vibration correction by said operational correction section if said exposure period is less than said threshold value and performing the image vibration correction by said composite correction section if said exposure period is equal to or more than said threshold value.

10. The imaging device according to claim 9, wherein
said exposure period determining section determines said threshold value based on a multiplication result obtained by multiplying a transfer period required to read an image of said imaging section by a division exposure count of said composite correction section to make the determination of said exposure period.

11. An imaging device, comprising:
an imaging section photoelectrically converting a subject image over a preset exposure period to generate image data;
an operational correction section applying an inverse filter of a point spread function indicating an image vibration during said exposure period to said image data to correct said image vibration;
a composite correction section correcting the image vibration of said image data by allowing said imaging section to perform imaging operations of plural times obtained by dividing said exposure period and registering and composing obtained plural frames of divided image data;

an exposure period determining section making a threshold determination as to whether or not a difference between a total shooting period required for said plural times of division exposures by said composite correction section and said exposure period is large; and a selection control section performing the image vibration correction by said operational correction section if it is determined by said exposure period determining section that said difference is large and performing the image vibration correction by said composite correction section if it is determined that said difference is small.

12. An imaging device, comprising:

an imaging section photoelectrically converting a subject image over a preset exposure period to generate image data;

a first image vibration correcting section obtaining an image vibration of said image data during said exposure period and performing an image vibration correction on said image data;

a second image vibration correcting section performing an image vibration correction on said image data by allowing said imaging section to perform imaging operations of plural times during said exposure period and by registering and composing obtained plural image data; and a selection control section determining said exposure period based on a threshold value according to a transfer period required to read an image of said imaging section and a focal length of when said image data is shot to select one of said first image vibration correcting section and said second image vibration correcting section to be used for the image vibration correction of said image data.

13. An imaging method, comprising:

photoelectrically converting at an imaging section a subject image over a preset exposure period to generate image data;

obtaining at a first image vibration correction section an image vibration of said image data during said exposure period and performing an image vibration correction on said image data;

performing at a second image vibration correcting section an image vibration correction on said image data by allowing said imaging section to perform imaging operations of plural times during said exposure period and by registering and composing obtained plural image data; and determining at a selection control section said exposure period based on a threshold value according to a transfer period required to read an image of said imaging section and count of said imaging operations by said second image vibration correction section to select one of said first image vibration correcting section and said second image vibration correcting section to be used for the image vibration correction of said image data.

14. The imaging method according to claim 13, wherein:

said first image vibration correcting section applies an inverse filter of a point spread function indicating an image vibration during said exposure period to said image data to correct said image vibration.

15. The imaging method according to claim 14, wherein said second image vibration correction section registers and composes the plural frames of said divided image data by pattern matching using a block matching method.

16. The imaging method according to claim 13, further comprising:

detecting at a vibration detecting section a vibration which causes said image vibration, wherein said first image vibration correcting section corrects said image vibration of said image data using the inverse filter of the point spread function according to the vibration detected by said vibration detecting section.

17. The imaging method according to claim 16, wherein said vibration detecting section includes an angular speed sensor.

18. An imaging method, comprising:

photoelectrically converting at an imaging section a subject image over a preset exposure period to generate image data;

obtaining at a first image vibration correction section an image vibration of said image data during said exposure period and performing an image vibration correction on said image data;

performing at a second image vibration correcting section an image vibration correction on said image data by allowing said imaging section to perform imaging operations plural times during said exposure period and by registering and composing obtained plural image data; and determining at a selection control section said exposure period based on a threshold value according to a transfer period required to read an image of said imaging section and a focal length of when said image data is shot to select one of said first image vibration correcting section and said second image vibration correcting section to be used for the image vibration correction of said image data.

* * * * *